No. 858,085. PATENTED JUNE 25, 1907.
J. H. LUBBERS.
FEED-OUT DEVICE FOR MOLTEN GLASS.
APPLICATION FILED AUG. 12, 1904.
2 SHEETS—SHEET 1.
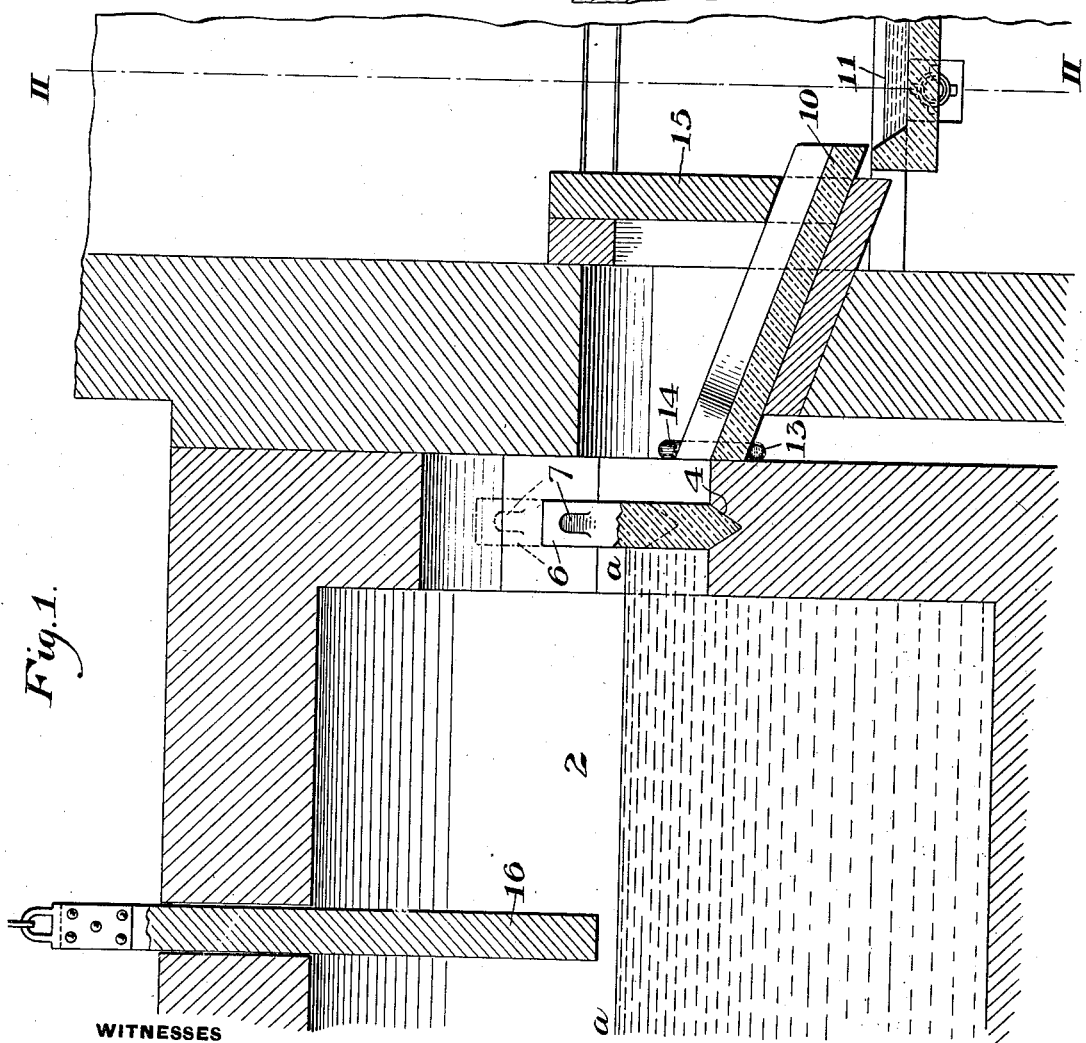
WITNESSES
INVENTOR

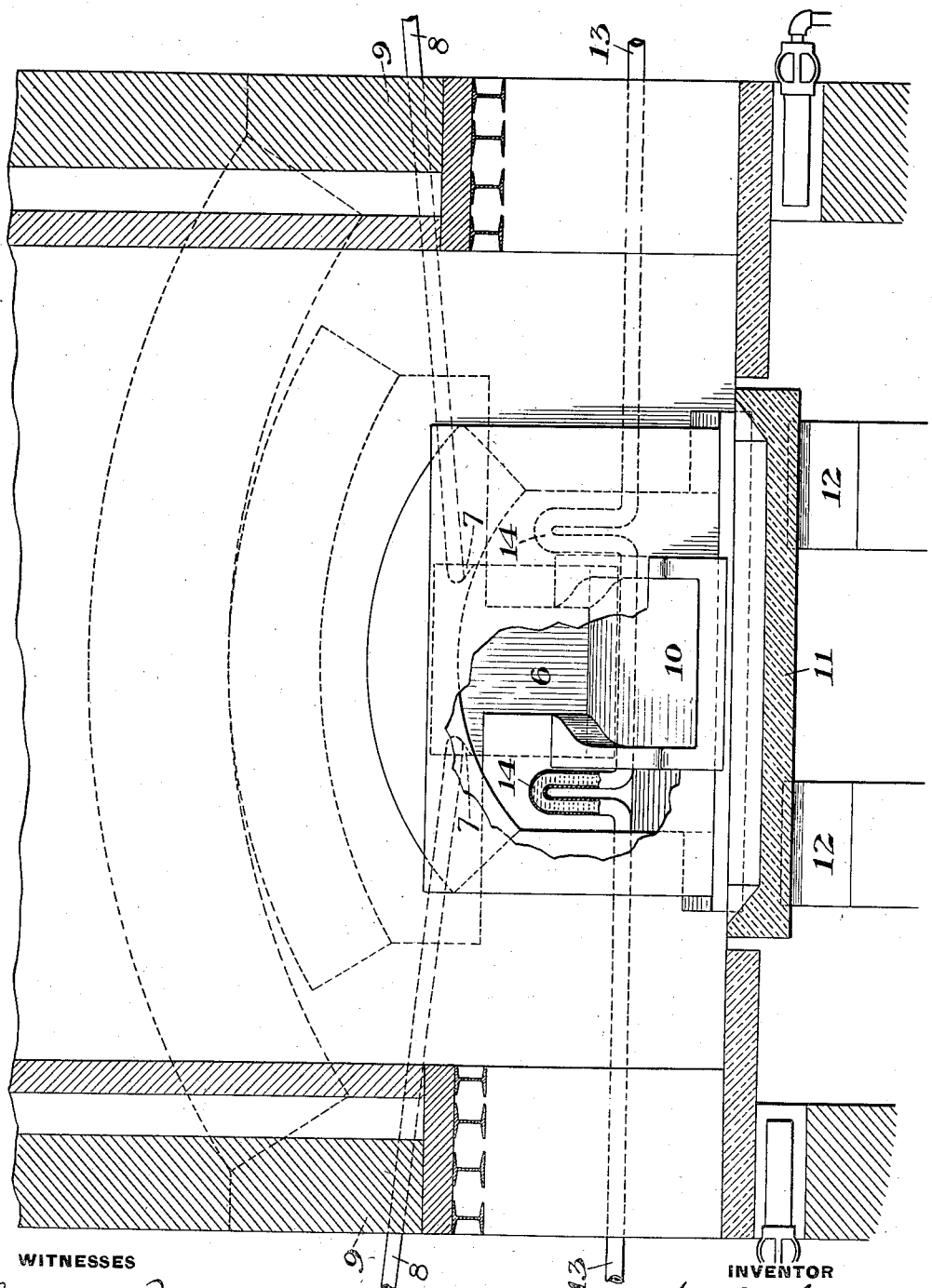

UNITED STATES PATENT OFFICE.

JOHN H. LUBBERS, OF ALLEGHENY, PENNSYLVANIA, ASSIGNOR TO WINDOW GLASS MACHINE COMPANY, OF PITTSBURG, PENNSYLVANIA, A CORPORATION OF NEW JERSEY.

FEED-OUT DEVICE FOR MOLTEN GLASS.

No. 858,085.     Specification of Letters Patent.     Patented June 25, 1907.

Application filed August 12, 1904. Serial No. 220,486.

*To all whom it may concern:*

Be it known that I, JOHN H. LUBBERS, of Allegheny, Allegheny county, Pennsylvania, have invented a new and useful Feed-Out Device for Molten Glass, of which the following is a full, clear, and exact description, reference being had to the accompanying drawings, forming part of this specification, in which—

Figure 1 is a longitudinal vertical section showing my improved feed-out device applied to the forehearth of a glass tank furnace; Fig. 2 is a vertical cross-section on the line II—II of Fig. 1, and Fig. 3 is a detail perspective view.

My invention relates to the feeding out of molten glass from a tank or receptacle containing it, and is designed to provide a simple and effective device of this character by which a desired quantity of glass can be withdrawn and the feed-out opening then shut off to prevent further flow.

In the drawing, 2 represents the forehearth of a glass tank furnace, in which the glass lies at about the level *a, a*. The front end of the forehearth is provided with an arched hole which has a central downwardly extending slot 4, with guiding slots 5, 5 at its sides. In these slots rests the vertically movable gate or valve 6 which is formed of a refractory slab of greater width than the slot 4, so that its edges will extend into the guiding slots 5, and preferably has a beveled or chamfered lower edge of V-shape in cross-section. The lower edge of this block when in closed position fits in a transverse notch or groove at the bottom of the slot in the dam block, and the upper end of the gate projects above the dam. This upper end portion may be provided with holes 7 at its ends to receive lever rods 8, 8 inserted through holes 9 in the side walls by which the block may be pried up or forced down into place.

From the lower edge of the port or slot in the dam a trough 10 leads forwardly and downwardly to the receptacle 11 to which the glass is to be supplied. This trough may be supported in a cross-wall 12 through a hole in which it extends; and to prevent dripping of the glass at the upper end of the trough either through its bottom or sides, I preferably use the water-cooling pipe 13 which extends under the joint of the trough and dam and is preferably provided with reversely bent portions 14 at the sides of the trough as shown in Fig. 2. Water is circulated through this pipe to cool the joint, so that any glass seeking to drop through the joint will be chilled and thus form a chilled glass seal to prevent escape of the flowing molten glass.

In order to cut off the heat of the forehearth from the pan or receptacle receiving the glass, I preferably provide a vertically movable refractory baffle or valve 15 which slides over the cross-wall and fits upon the lower end portion of the trough. The hole through the cross-wall is thus cut off from the pan or receptacle, and the heat of the forehearth is shut off.

In order to give access to the feed-out device and to cut off the heat of the furnace thereform, I further provide the vertically movable baffle 16 which slides through a transverse slot in the roof of the forehearth, and may be raised and lowered by a suitable connecting rope or chain.

In using the apparatus the parts are held in the position shown in Fig. 1 until it is desired to draw glass into the receptacle. The rods are then inserted in the end holes of the gate and it is pried up to allow the glass to flow through the slot in the dam and down through the trough into the receptacle. When the proper amount of glass has been delivered the gate is forced down, and its V-shaped edge entering the notch in the dam will cut off the glass and prevent further flow. This interfitting of the gate and dam may not be employed, though I prefer to use it, as giving a better seal.

Many variations may be made in the form and arrangement of the furnace, forehearth, trough, and gate device, without departing from my invention.

I claim:

1. In a glass feed-out device, a melting furnace having a forehearth with a discharge opening in its wall, a refractory valve block for controlling the said opening, a cross-wall having an opening therethrough, an inclined trough supported in said opening, and means for confining the heat from the forehearth in the chamber around the trough formed by the cross wall; substantially as described.

2. In a glass feed-out device, a dam formed with a port extending below the level of the bath, a refractory valve for said port, and an inclined trough leading from the port, and having an inclosed heating atmosphere, together with a baffle arranged to cut off the heat from the receptacle into which the glass discharges; substantially as described.

3. In a glass feed-out device, a dam having an outlet port extending below the level of the bath, and a refractory valve arranged to control said port, said valve being arranged to be actuated from its ends; substantially as described.

4. In a glass feed-out device, a wall having a dam with an opening above it, and a port extending below the level of the bath, and a refractory valve for controlling said port, said valve having a reduced or beveled lower edge arranged to seat in a V-shaped recess of the dam; substantially as described.

5. In a glass feed-out device, a forehearth having an opening in its front wall, an inclined trough with which the opening communicates, a refractory valve for controlling the opening, and an inclosing chamber for the said trough terminating above its discharge end and acting to confine the heat from the forehearth; substantially as described.

6. In a glass feed-out device, a wall having a slot extending below the level of the bath, a vertically movable refractory gate therefor, a trough leading from the slot, and a cooling device for the joint between the trough and the wall; substantially as described.

7. In a glass feed-out device, a wall having a dam with an opening above it, and a port extending below the level of the bath, a receptacle, a trough leading from the port to the receptacle, and means for shutting off the heat of the glass bath from the receptacle; substantially as described.

8. In a glass feed-out device, a tank furnace having a forehearth, a feed-out device at the end of the forehearth, and a baffle arranged to cut off the heat from the feed-out device; substantially as described.

9. In a glass feed-out device, a forehearth having an opening in its front wall, a trough leading from the opening, and a water-cooling pipe which extends under the joint between the trough and wall, said pipe having reversely bent portions at each side of the trough; substantially as described.

In testimony whereof, I have hereunto set my hand.

JOHN H. LUBBERS.

Witnesses:
H. M. CORWIN,
JOHN MILLER.